Figure 1:
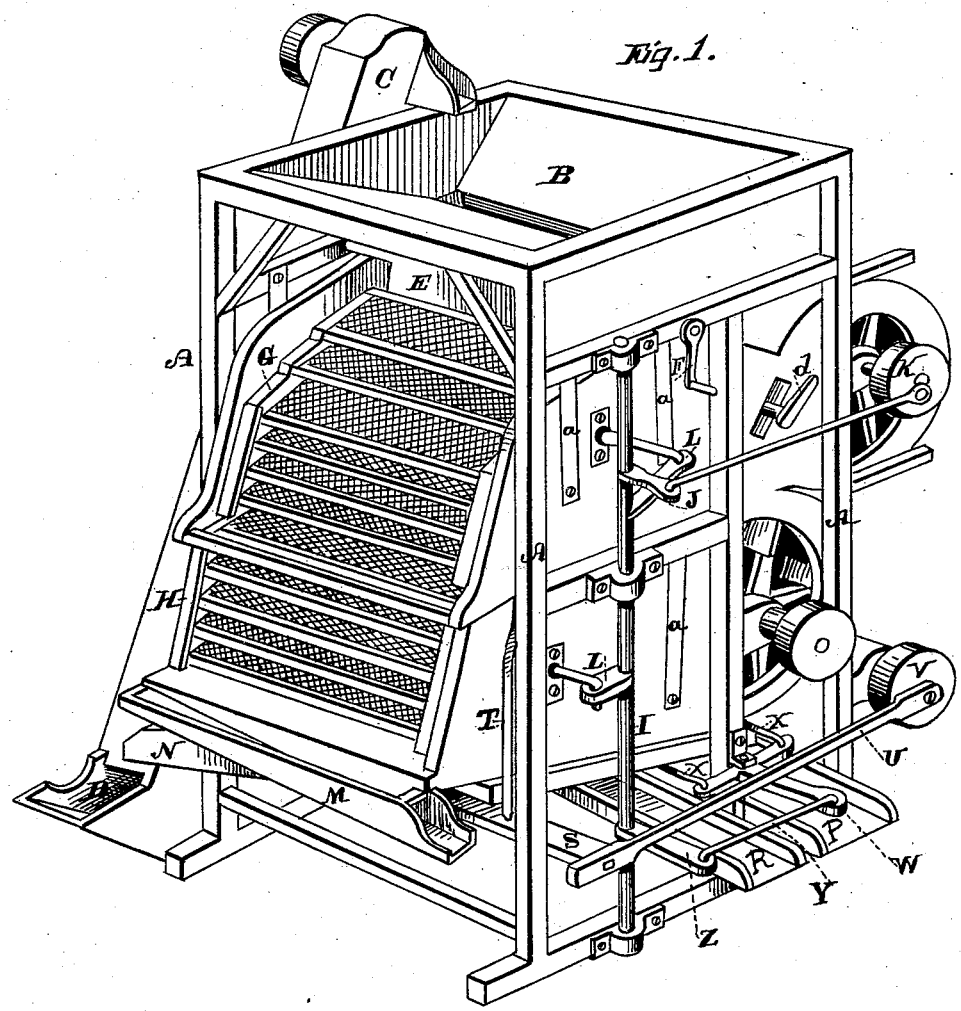

(No Model.)     2 Sheets—Sheet 1.

D. BEST.
GRAIN SEPARATOR AND CLEANER.

No. 264,509.     Patented Sept. 19, 1882.

(No Model.) 2 Sheets—Sheet 2.
D. BEST.
GRAIN SEPARATOR AND CLEANER.
No. 264,509. Patented Sept. 19, 1882.
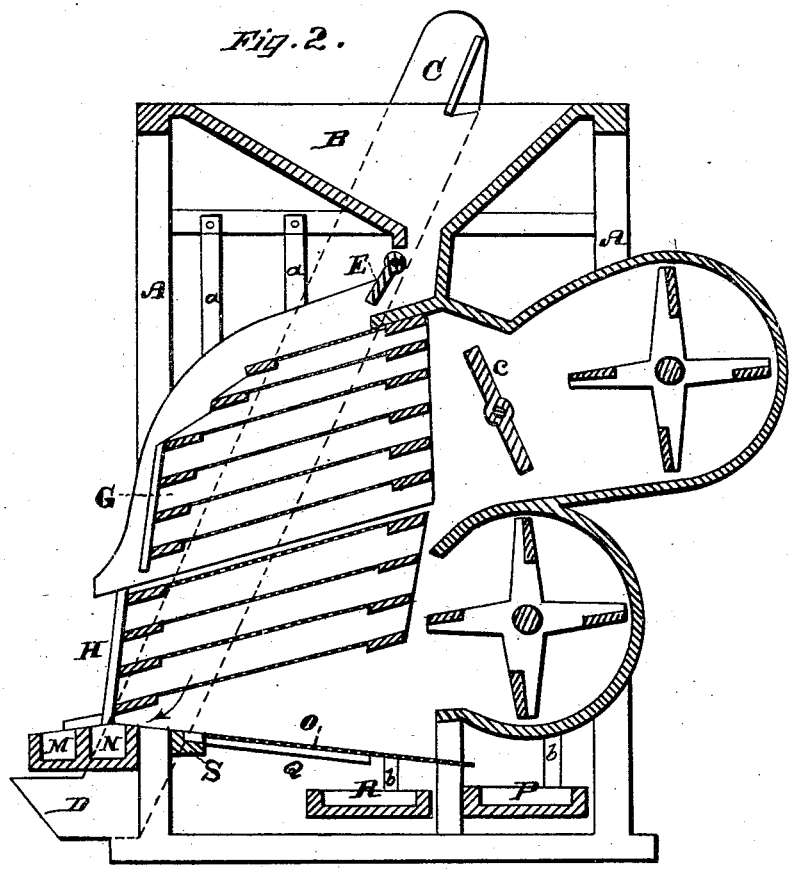
Fig. 2.
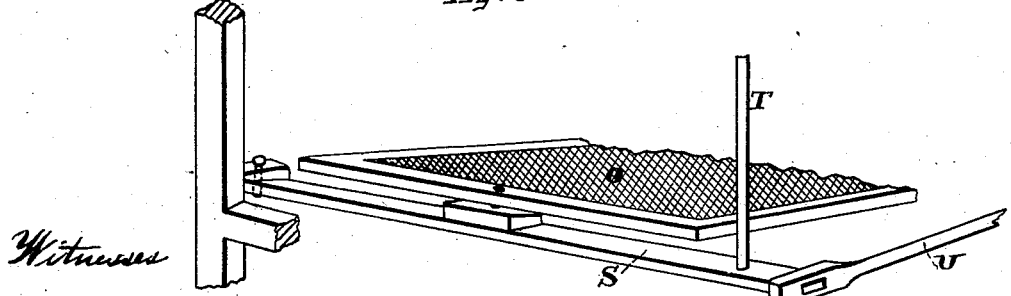
Fig. 3.
Fig. 4.
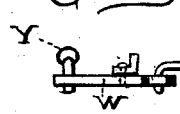
Witnesses
Geo. H. Strong
Frank A. Brooks
Inventor
Daniel Best
By Dewey & Co.
Attys

UNITED STATES PATENT OFFICE.

DANIEL BEST, OF ALBANY, OREGON.

GRAIN SEPARATOR AND CLEANER.

SPECIFICATION forming part of Letters Patent No. 264,509, dated September 19, 1882.

Application filed May 16, 1881. (No model.)

*To all whom it may concern:*

Be it known that I, DANIEL BEST, of Albany, county of Linn, State of Oregon, have invented an Improved Grain Separator and Cleaner; and I do hereby declare the following to be a full, clear, and exact description thereof.

My invention relates to certain improvements in grain separating or cleaning apparatus; and it consists in certain specific details of construction forming a novel and efficient grain-separator.

The invention is represented in the accompanying drawings, in which Figure 1 is an exterior view of my machine. Fig. 2 is a vertical longitudinal section. Fig. 3 is a separate view of the screen and its connections. Fig. 4 is a side elevation, partly in section, of the chute or trough and means for operating it.

A is the frame-work within which the mechanism is placed.

B is a receiving-hopper at the top, into which the grain is discharged from the elevator C. This elevator brings the grain up from the lower hopper, D, this part of the apparatus being similar in its action to that shown in my patent of April 25, 1871; but in my present improvement the elevator and the hopper D are placed close to the side of the machine, so that the grain which is to be returned from the riddles may be led directly into the hopper from them by a spout without any intermediate spouts or carriers. The grain passes from the hopper B upon a board which extends the full length of the hopper and the width of the riddles, and is delivered in a thin sheet upon the upper edge of the top riddle, so as to flow down over it. A swinging gate, E, extends across this board just below the hopper, and its shaft passes through to the outside, and has a crank, F, with a suitable rack, so that by it the position of the gate may be changed and the flow of grain upon the riddles regulated to suit their capacity.

My riddles are of the peculiar curved form shown in my former patent, and are set in two independent shoes or gangs, G and H, which are suspended by links or springs *a a*, so as to swing one above the other, as shown. The riddles of the upper shoe discharge directly upon those of the lower shoe, and the two shoes have an opposite side shake, motion being given them as follows:

A vertical shaft, I, turns in boxes at one side of the machine, and has an arm, J, projecting from it, which is connected with a crank-pin upon the pulley K of the upper fan-shaft, or other convenient driving-shaft, so that by its rotation an oscillating motion is imparted to the vertical shaft I.

Two short arms, L L, project from opposite sides of the vertical shaft at such points that one is connected by a link with the upper shoe and the other is connected with the lower shoe.

It will be seen that by this construction each oscillation of the vertical shaft I will move the shoes G and H across the machine and in opposite directions. This I have found very important, because when only a single motion is given to the shoe in large machines—such as are used in mills or warehouses, or such as are used to separate the grain as it comes directly from the thrashing-machine—the oscillation of the machine becomes so great that it is difficult to brace it enough to keep it in place. By my construction the opposite motion of the shoes will balance each other, and a high rate of speed may be obtained without shaking the machine unduly.

M is an inclined spout, which is secured transversely across the rear of the lower shoe, and serves to catch the barley and light grain from the riddles and deliver them at one side of the machine.

The spout N will receive the second quality of grain and that which should be subjected to a further cleaning after it has passed through the shoe H, and will carry it directly to the hopper D, from which it will be returned to the upper hopper and the shoes, as in my former machine.

Below the shoe H is the screen O, which receives the cleaned grain and delivers it to the spout P, while the mustard falls through upon the bottom Q, and is delivered by it into the spout R. The higher or rear end of the screen O is attached to a transverse bar, S, by a pin, which passes through the center of its frame. The bar S has one end pivoted to one side of frame, and the other end is suspended by a spring-arm, T, depending from some portion of the frame.

A connecting-rod, U, extends from the free end of the bar S to a crank-pulley, V, by which it is driven, and through it the screen is given an end-shaking motion with an effect similar to that of my former machine.

The spouts P and R have an alternate shaking motion in the direction of their length and across the machine, which is produced by a triple-armed lever, W.

Rods X extend from the two arms in line on each side of the fulcrum to the spouts P and R, while the arm of the lever which projects at right angles is united by a connecting-rod, Y, with an arm, Z, which projects from the foot of the vertical oscillating shaft I. The motion of these spouts is thus balanced by their alternation, and they do not shake the machine. Springs b, at the end opposite the actuating-levers, assist the movement of the spouts.

I employ two fans in this case, as in my former machine, one furnishing a blast for the upper shoe and the other for the lower one.

A wind-board, c, is operated by an arm, d, outside the machine, and the direction of the blast is thus regulated.

Having thus described my invention, what I claim as new, and desire to secure by Letters Patent, is—

The improved grain-separator described, consisting of a hopper, B, the independent suspended shoes G H, each carrying a series of separating-riddles, rock-shaft I, connected by cranks L to the said shoes, whereby they are given a transverse oscillatory movement in opposite directions, the grain-spouts M N, connected to the lower shoe, the cleaning-screen O, adapted to receive a compound shaking and tossing motion through the spring T, pitman U, and wheel V, and the spouts R P, connected to the rock-shaft by the rod Y and lever W, whereby they receive a transverse movement in opposite directions, all substantially as described.

In witness whereof I hereunto set my hand.

DANIEL BEST.

Witnesses:
S. H. ALTHOUSE,
GEO. W. PIERCE.